United States Patent
Kelkar et al.

(10) Patent No.: US 9,122,536 B2
(45) Date of Patent: Sep. 1, 2015

(54) AUTOMATING APPLICATION PROVISIONING FOR HETEROGENEOUS DATACENTER ENVIRONMENTS

(75) Inventors: Suhas A. Kelkar, Houston, TX (US); Monish Darda, Houston, TX (US); Manikantan Narender Nath, Houston, TX (US)

(73) Assignee: BMC SOFTWARE, INC., Houston, TX (US)

( * ) Notice: Subject to any disclaimer, the term of this patent is extended or adjusted under 35 U.S.C. 154(b) by 372 days.

(21) Appl. No.: 12/872,921

(22) Filed: Aug. 31, 2010

(65) Prior Publication Data
US 2011/0213885 A1    Sep. 1, 2011

Related U.S. Application Data

(60) Provisional application No. 61/291,115, filed on Dec. 30, 2009.

(51) Int. Cl.
*G06F 15/173* (2006.01)
*G06F 9/50* (2006.01)

(52) U.S. Cl.
CPC ........ *G06F 9/5072* (2013.01); *G06F 2209/503* (2013.01); *G06F 2209/5011* (2013.01); *G06F 2209/5014* (2013.01)

(58) Field of Classification Search
None
See application file for complete search history.

(56) References Cited

U.S. PATENT DOCUMENTS

| | | | |
|---|---|---|---|
| 7,516,206 B2 * | 4/2009 | Henseler et al. | 709/223 |
| 7,797,288 B2 * | 9/2010 | Zhang et al. | 707/694 |
| 2003/0154112 A1 * | 8/2003 | Neiman et al. | 705/5 |
| 2006/0005181 A1 * | 1/2006 | Fellenstein et al. | 717/174 |
| 2007/0078988 A1 * | 4/2007 | Miloushev et al. | 709/227 |
| 2007/0169049 A1 * | 7/2007 | Gingell et al. | 717/151 |
| 2008/0059610 A1 * | 3/2008 | Lin et al. | 709/220 |
| 2009/0276771 A1 * | 11/2009 | Nickolov et al. | 717/177 |

* cited by examiner

*Primary Examiner* — Abdullahi Salad

(57) ABSTRACT

Disclosed are methods and systems to automate the provisioning and deployment of application instances within a heterogeneous data center. In one embodiment, the application provisioning is performed based upon a blueprint and deployment model defining requirements of the provisioned application. In another embodiment, the totality of available resources for provisioning is divided into different segments. When resources are requested and assigned to an incoming provisioning request, the resource pool may be refreshed or augmented as defined by thresholds or forecasting of user needs. The resource pool may be refreshed by recapturing allocated resources that are no longer in use or by configuring resources taken from the reserve. Further, when reserve resources are not available or are below a minimum reserve threshold, capacity planning actions may be initiated or advised.

27 Claims, 4 Drawing Sheets

AUTOMATING APPLICATION PROVISIONING FOR HETEROGENEOUS DATACENTER ENVIRONMENTS

CROSS REFERENCE TO RELATED APPLICATIONS

This disclosure claims priority to Provisional U.S. Patent Application Ser. No. 61/291,115 filed 30 Dec. 2009 by Suhas A. Kelkar et al. entitled "Automating Application Provisioning for Heterogeneous Datacenter Environments (Using Application Blueprint and Deployment Model)" and which is hereby incorporated by reference in its entirety. This disclosure is also related to U.S. patent application Ser. No. 12/847,949 filed 30 Jul. 2010 by Suhas A. Kelkar et al. entitled "Application Blueprint and Deployment Model for Dynamic Business Service Management (BSM)" and which is hereby incorporated by reference in its entirety.

BACKGROUND

Datacenters are increasingly being required to rapidly adapt to changes in customer requirements. It is no longer sufficient to provide a fixed, unchanging collection of servers and application software programs. Datacenters could benefit from being able to completely reconfigure servers in a very short period of time in order to keep up with the constantly varying demands of content and application service providers. The need for a dynamic operating environment has resulted in the development of deployable application servers. Application servers may be deployed using a number of solutions, including script based installations of operating systems and applications remotely launched from a deployment management station, as well as virtual machine image based installations onto a system running a hypervisor, just to name two examples. In computing, a hypervisor, also called a virtual machine monitor (VMM), is a piece of software/hardware performing a platform-virtualization function that allows multiple instances of an operating system to run on a host computer concurrently (e.g., virtual machines).

Script-based installations of an application server are typically slow. It may take a significant amount of time to run the script-based installation (up to several hours) and thus may not be adequate to rapidly respond to changes in demand. In contrast, virtual machine images can be deployed more quickly than script-based solutions. However, prior art images of virtual machines must be preconfigured as if they were a homogeneous replica of an application server and thus represent a static resource that cannot be quickly created "on-demand" in response to unexpected requirement and demand changes.

Additionally, both script-based and deployment of pre-configured virtual machine images can also include manual processes that may be very susceptible to human error. To complicate matters further, existing solutions are not designed to handle a heterogeneous operating environment, wherein different application products, different operating systems and different real (i.e., physical servers) and virtual computer systems may all need to co-exist and work together to optimally satisfy the needs of a datacenter.

The subject matter of the present disclosure is directed to overcoming, or at least reducing the effects of, one or more of the problems set forth above.

SUMMARY

Disclosed are methods and systems to automate the provisioning and deployment of application server instances within a heterogeneous data center. In one embodiment, the application provisioning is performed based upon a blueprint (BP) and deployment model (DM) defining requirements of the provisioned system. In another embodiment, the totality of available resources for provisioning is divided into different segments. Example segments include but are not limited to allocated resources, pre-configured and unallocated resources (i.e., resource pools), and unallocated and unconfigured resources (i.e., reserve resources). When resources are requested and assigned to an end-user, the resource pools may be refreshed or augmented as defined by thresholds or forecasting of user needs. The resource pools may also be refreshed by recapturing allocated resources that are no longer in use or by configuring resources taken from the reserve. Further, when reserve resources are not available or are below a minimum reserve threshold, capacity planning actions may be initiated or advised.

DETAILED DESCRIPTION

Figure 1:
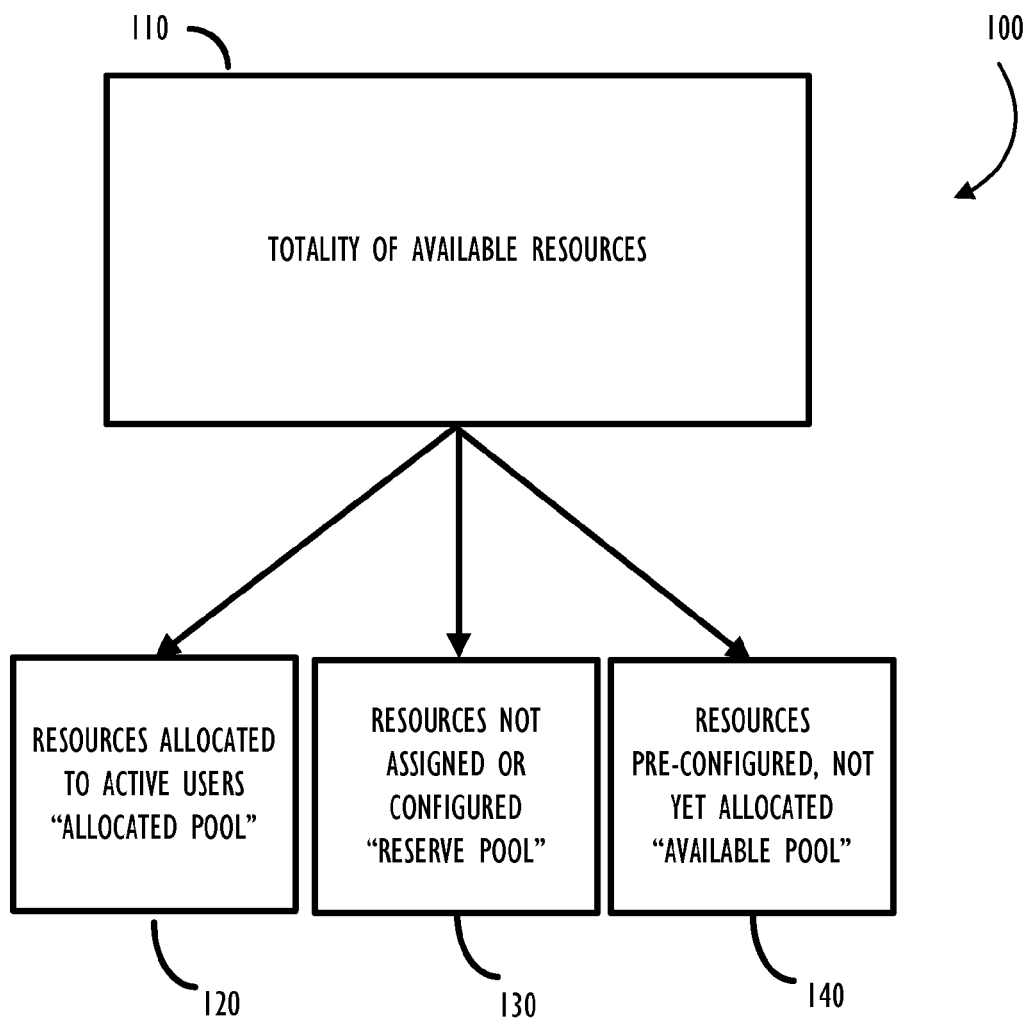
FIG. 1 illustrates, in block diagram form, an example division of computer resources for application provisioning.

The present disclosure describes systems and methods for automating the provisioning and deployment of application server instances within a heterogeneous operating environment. At least some embodiments enable a user to request an application instance from a self-service menu of choices. After the selections are made, the application provisioning and deployment is performed automatically by a provisioning engine using as input a blueprint and a deployment model selected or identified by the requesting user or system.

Application server provisioning refers to selecting a server from a pool of available servers, either real or virtual, and preparing the selected server for a requesting end-user. Preparing the selected server includes, but may not be limited to, loading the server with the appropriate software (e.g., operating system, device drivers, middle ware, and applications), appropriately customizing and configuring the system, and starting the server with its newly-loaded software. Customizing and configuring may include configuring a boot image for the server by changing its stored parameters to affect how it will be instantiated. For example, patches could be applied to the boot image, an audit could be performed on the boot image, or addresses of the boot image (e.g., network address, gateway address) could be altered. After these setup tasks are performed, either prior to or after the step of instantiating the image, the provisioned server is ready for operation and addition to a datacenter network.

In some disclosed embodiments, a user-selectable application definition (ADF) or blueprint (BP) defines at least part of the structure of an application or an application server in terms of "tiers" and the relationships between tiers. Tiers can represent classes of application servers that are available for selection by a user of a computer system implementing the described embodiments. Examples of tiers that may be defined within a BP include, but are not limited to, a database tier and a web tier. Other applications and application tiers that may be included within a BP will become apparent to those of ordinary skill in the art, and all such applications and application tiers are contemplated by the present disclosure.

A BP may also include one or more deployment options associated with each tier, such as different product choices and combinations. Thus, for example, a user may select a BP that includes either JBoss® 4.0 or Tomcat as the product that is to be installed to implement a web tier and either Oracle 10g® or MySQL® 5 for a database tier. (JBOSS is a registered trademark of Red Hat, Inc. ORACLE 10G is a registered trademark of Oracle International Corporation. MYSQL is a registered trademark of MySQL AB A Company. Tomcat is a trademark of the Apache Software Foundation). Any number of different tiers may be defined, reflecting the broad variety of applications that may be hosted on a deployed server. A BP may also define environment and other variables needed to successfully provision a server. However, because a BP does not specify physical resources, virtual resources or content needed for successful application server provisioning, the BP is therefore portable and can be reused across a wide variety of different resources available within a heterogeneous datacenter.

In some embodiments, a user-selectable deployment intent definition (DDF) or deployment model (DM) may also be defined and can be used to at least partially augment a BP or ADF. The DM conforms to a BP but is a lower level document that focuses on the intent of the deployment (e.g., production, testing, demonstration and quality control uses). The DM can be used to associate product content with each tier defined within the blueprint. Such content may include installation programs, artifacts and configuration scripts that are used to configure the application server and its environment to conform to a user's requirements. The deployment model may further associate resource requirements with the products for each tier such as, minimum required computing, storage and network resource capacities. The deployment model may also include one or more rules that further govern the provisioning and deployment of application server instances (e.g., a maximum number of instances based upon the level of service required/purchased by the user).

For more information about application blueprints and deployment models please refer to U.S. patent application Ser. No. 12/847,949 filed 30 Jul. 2010 by Suhas A. Kelkar et al. entitled "Application Blueprint and Deployment Model for Dynamic Business Service Management (BSM)" which is hereby incorporated by reference in its entirety.

One goal of a corporation's information technology (IT) management is capacity planning. Capacity planning, in a computer system context, is a discipline to ensure enough resources are available to handle a maximum amount of workload at a given time without requiring the corporation to purchase and maintain excess computer resources. Capacity planning is typically performed using both historical data about computer resource loads and forecast data pertaining to increases in use of business services or business applications. In one embodiment of this disclosure, capacity planning can be performed proactively by interfacing with computer scheduling software to ensure enough resources are available from a resource pool and proactively provisioned at or before they are needed to perform scheduled jobs. One example of computer scheduling software is BMC Control-M for Distributed Systems available from BMC Software, Inc. of Houston Tex.

Referring now to FIG. 1, block diagram 100 illustrates one possible division of a totality of available resources (block 110) divided into three (3) pools (i.e., logical groupings). An Allocated Pool 120 represents resources that have been provisioned and are currently associated with an executing application or a persistently allocated application (i.e., one that is not provisioned repeatedly when needed). Reserve Pool 130 represents "raw" resources that have not yet been configured. When "raw" resources are configured they may be added to either the Available Pool 140 or, if necessary, immediately used to satisfy an allocation request and thus be added to the Allocated Pool 120. Available Pool 140 represents compute, network, and storage, etc. Resources in Available Pool 140 can be resources that have been pre-configured in anticipation of some expected future or to satisfy an immediate need.

As illustrated in block diagram 100, there are three pools; however, any number of pools may be defined. For example, Available Pool 140 could be divided into several pools based on the specificity to which resources in the pools have been pre-configured. Some resources may have been pre-configured with only an operating system and a default level of compute capacity. Other resources may have been configured with an operating system (OS), OS patches, and an application or set of applications installed. Those of ordinary skill in the art, given the benefit of this disclosure, will recognize that optimizing the granularity of pools and specificity of preconfiguration of resources in pools may vary from one enterprise environment to the next based on particulars of each enterprise environment.

In accordance with this disclosure, at least some embodiments are implemented in hardware, software or a combination of hardware and software by one or more computer systems communicatively coupled to each other across a network or bus. At least one of the computer systems performs functions that include a provisioning engine. One example of a network of computer resources to illustrate a possible embodiment of this disclosure is system 200 shown in FIG. 2. The provisioning engine 200 can automate the provisioning and deployment process and provide an abstraction layer that isolates a system user from many of the details associated with the process. An example of one possible control flow which could be implemented in system 200 is shown in process 300 of FIG. 3 described further below.

Figure 2:
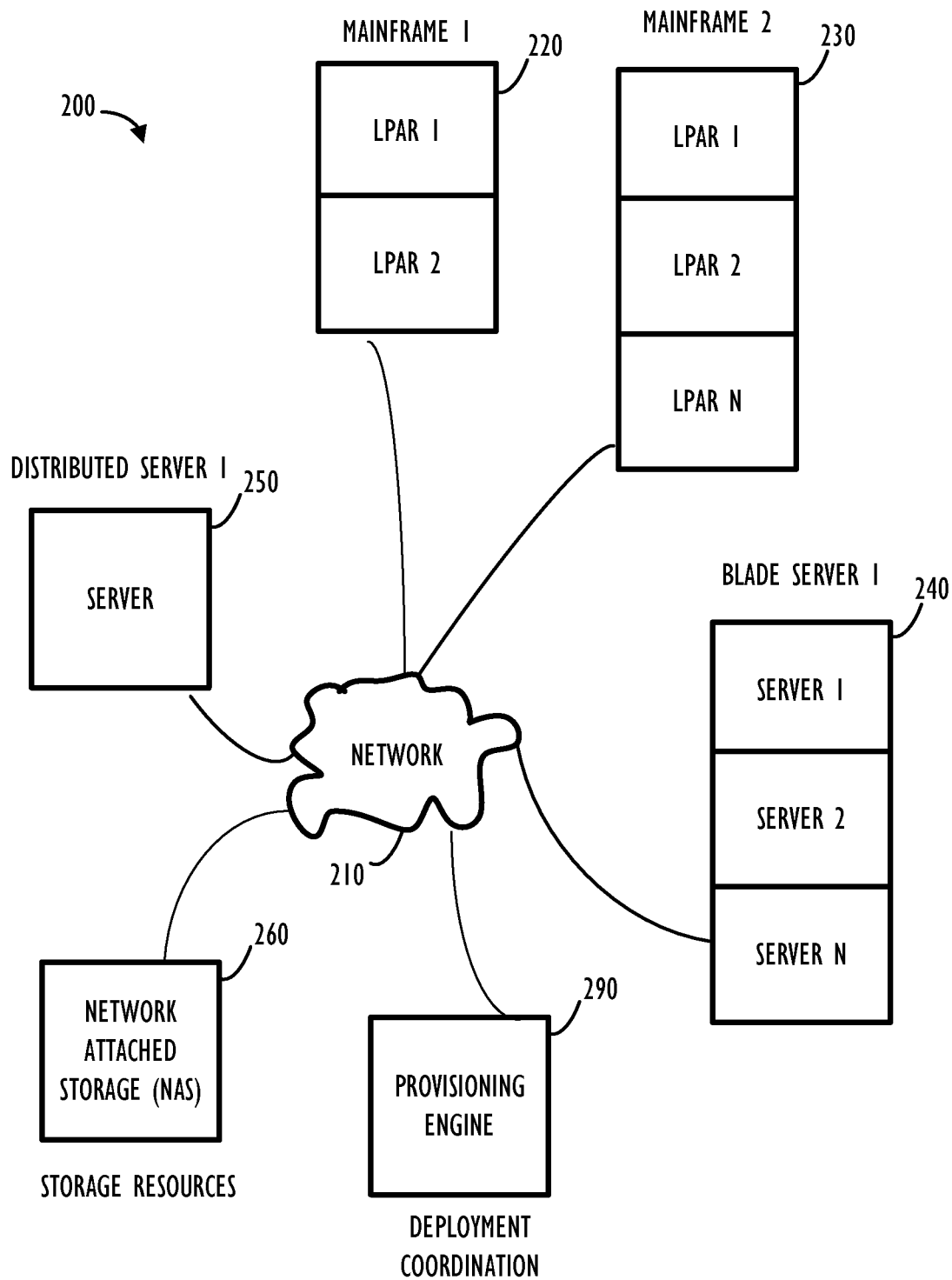
FIG. 2 illustrates, in block diagram form, an example system of heterogeneous computer resources communicatively coupled via a network.

With reference to FIG. 2 and system 200, an overview of a provisioning process is described as an example of one possible disclosed embodiment. In this example embodiment, a user may request an application instance by identifying a blueprint and a desired deployment model. The identification can take place on a work station computer attached to network 210 and providing a suitable user interface. The user's blueprint and deployment model request can then be forwarded across network 210 for processing by provisioning engine 290. Provisioning engine 200 can derive the requested DM (DDF) from the BP (ADF) by augmenting the BP with information from the DM. Next, provisioning engine 290 alone or with the help of another network attached processor can determine which resources, from appropriate resource pools, are needed to meet the request. The provisioning engine can then interact with a resource pool manager (not shown) to select the required storage resource(s) from storage resource pool 260 and/or compute resources from compute resource pools 220-250. The resource pool manager can access a pool of resources and group the resources as necessary to meet a request (e.g., server 250, network 210 and storage resources 260). Server resources may be real or virtual and may include, for example, individual computer systems (e.g., 250), logical partitions within a mainframe computer (e.g., 220 and 230) and computer systems running hypervisors such as blade server 240. Storage 260 and network 210 resources may also be either real or virtual.

After the required resources are selected, provisioning engine 290 can interact with a provisioning product (e.g., BMC BladeLogic®) to provision the selected resources as specified by the BP and DM. (BLADELOGIC is a registered trademark of BladeLogic, Inc.) The products or product combinations used to provision the resources may be drawn from one or more product pools (e.g., an image server storing preconfigured images). For example, a pool of virtual machine images configured as generic Oracle® database servers running under Linux® may be provided by the provisioning product for installation on the selected resources. (ORACLE is a registered trademark of Oracle Corporation; LINUX is a registered trademark of Linus Torvalds.). Such an installation may be done by copying the virtual machine image to the selected storage resource and configuring a hypervisor on the selected server resource to activate the copied virtual machine image. Once activated and booted, the virtual machine and database server application may be further configured to conform to the requested deployment model (e.g., using one or more installation scripts specified by the deployment model).

In at least some embodiments, pools of preconfigured products and/or product combinations can be maintained such that provisioning engine 290 can automatically draw upon them when the number of available products/combinations within a pool drops below a threshold value. For example, if the pool of Oracle on Linux virtual machine images becomes depleted, the provisioning product can automatically draw upon another pool of Linux virtual machine images, install and activate the image(s) on temporarily allocated resources (e.g., by requesting resources from the resource manager) and install an Oracle server with a generic configuration on the Linux image. Because the product pool replenishing can be performed proactively before a product or product combination is needed, products/combinations may be provisioned on-demand with little or no delay. Once installed, the image may be deactivated and saved into the appropriate product pool and the resources used for the installation returned to the appropriate resource pool.

If a product or product combination is not available when requested because a pool is depleted or because a pool does not exist for the requested product or product combination, the request may still be met by creating a product/combination that meets the requirements of the selected BP and DM. Although the requested provisioning may take additional time to complete, the process can remain highly automated and the user still does not need to know the low-level details regarding the selection and provisioning of resources. Further, because product pools may draw upon other product pools, near on-demand performance may be maintained, with performance decreases being experienced by the user gradually rather than suddenly as pools become depleted. Such performance degradations may be corrected or avoided by increasing the product pool allocations either manually or automatically in response to product and product combination demands.

Figure 3:
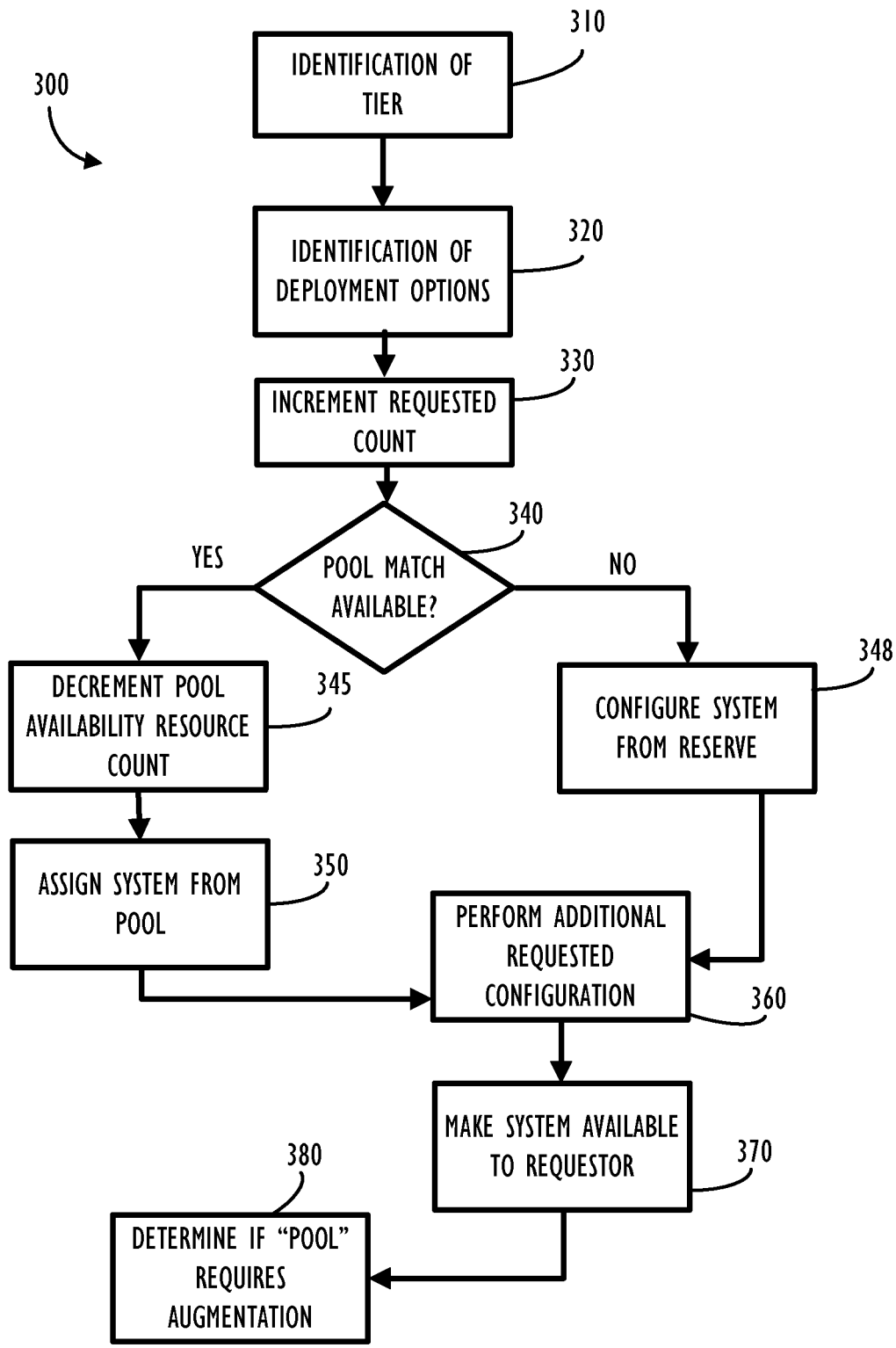
FIG. 3 illustrates, in flowchart form, an embodiment of application provisioning of computer system resources.

Referring now to FIG. 3, process 300 illustrates a more detailed embodiment of the overview embodiment described above. Beginning at block 310, a Tier is identified based on the augmented model (i.e., that created by augmenting the BP with the DM). Next, at block 320 the deployment options are identified to satisfy the augmented model requirements. For example, the augmented model may require Linux and Oracle or may also function properly on Windows and MySQL. Counts of requested resources can be maintained (block 330) for capacity planning purposes or for proactive configuring of resource pools as described above. The deployment options can also be taken into account when performing a search for matching resources from the resource pool (decision 340). If no matching resources are currently available (the NO prong of 340) a system(s) may be configured from reserve pools at block 348. If matching resources are available (the YES prong of 340) then the pool availability counters can be decremented at block 345 and the available pools can be assigned to satisfy the request at block 350. In either case, after the system(s) are configured processing flow continues to block 360 where additional required configurations can be performed. At block 370, after all configuration steps are complete the system(s) is made available to the requestor. Finally, block 380 illustrates that a determination can be made to determine if any of the pools need to be replenished from the reserve in anticipation of a future request. Note that block 380 may be performed as shown, periodically or at any time in process 300. Also note that replenishment may comprise replacing resources with different resources capable of performing a similar function. For example, a windows server running Oracle may be configured to replace a Linux server running Oracle when no more Linux instances or licenses for Oracle on Linux are available. This can be thought of as replenishing with substantially similar or resources commensurate with resources utilized to support a previous provisioning request.

Using the embodiments described herein, a user may define an application server as generally or as specifically as desired and may do so without having to specify or have specific knowledge regarding the resources actually provisioned to deploy the application server. BPs and DMs may be selected independent of the resources (real or virtual) used to support the application server. Further, BPs are not necessarily tied to content or vendor-specific resources and/or products and can be specified generically. This can provide significant flexibility in assigning available resources and/or products across a heterogeneous operating environment. Datacenters utilizing a disclosed embodiment may thus offer a wide variety of pricing options based not only upon the level of service provided, but also based upon the flexibility of the user's requirements. For example, a user that agrees to accept any of a variety of application server configurations may be offered a lower resource pricing than a user that requires a single, specific application server configuration. Additionally, content (e.g., deployment-specific configuration scripts, applications, patches, etc.) does not need to be packaged within either the blueprint or the deployment model and can be maintained separately. Content may therefore be modified without requiring modifications to the BPs or DMs that reference the content.

Figure 4:
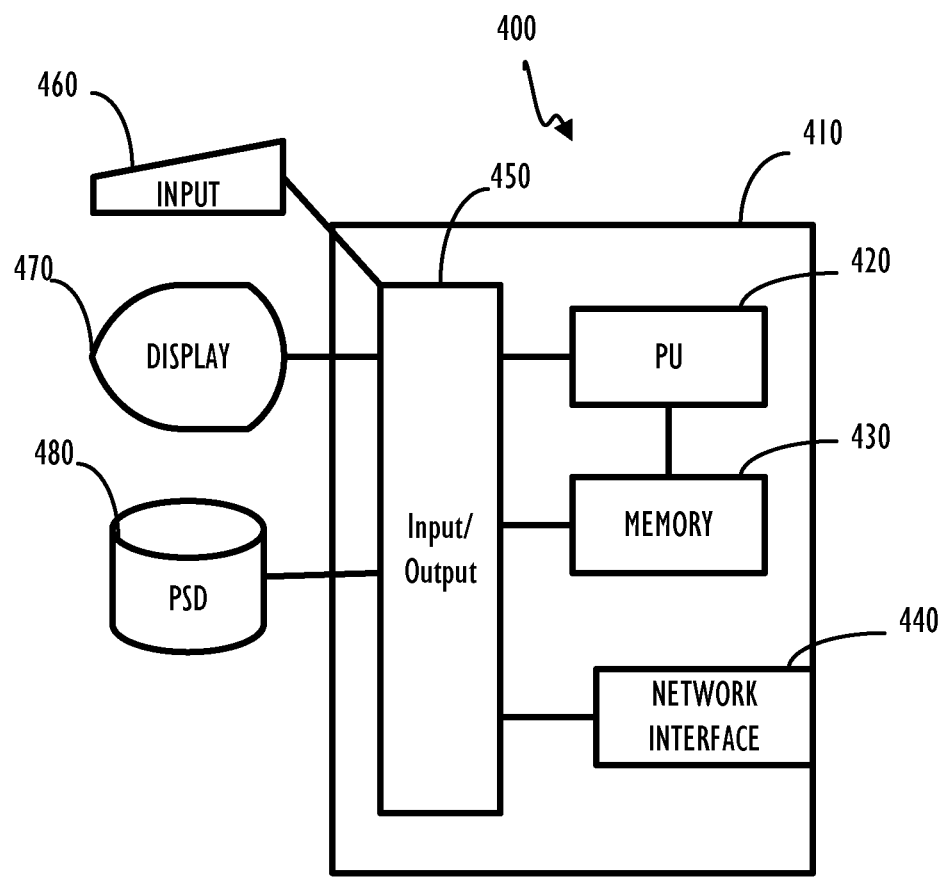
FIG. 4 illustrates, in block diagram form, an example computing device comprising a program control device.

Referring now to FIG. 4, exemplary computing device 400 is shown. One or more exemplary computing devices 400 may be included in a mainframe computer (not shown). Exemplary computing device 400 comprises a programmable control device 410 which may be optionally connected to input device 460 (e.g., keyboard, mouse, touch screen, etc.), display 470 or program storage device (PSD) 480 (sometimes referred to as a direct access storage device DASD). Also, included with program device 410 is network interface 440 for communication via a network with other computing and corporate infrastructure devices (not shown). Note, network interface 440 may be included within programmable control device 410 or be external to programmable control device 410. In either case, programmable control device 410 will be communicatively coupled to network interface 440. Also note, program storage unit 480 represents any form of nonvolatile storage including, but not limited to, all forms of optical and magnetic storage elements including solid-state storage.

Program control device 410 may be included in a computing device and be programmed to perform methods in accordance with this disclosure (e.g., those illustrated in FIG. 3). Program control device 410 may itself comprise processor unit (PU) 420, input-output (I/O) interface 450 and memory 430. Processing unit 420 may include any programmable controller device including, for example, processors of an IBM mainframe (such as a quad-core z10 mainframe microprocessor). Alternatively, in non-mainframe systems examples of processing unit 420 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 430 may include one or more memory modules and comprise random access memory (RAM), read only memory (ROM), programmable read only memory (PROM), programmable read-write memory, and solid state memory. One of ordinary skill in the art will also recognize that PU 420 may also include some internal memory including, for example, cache memory.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIG. 3 may be performed in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIG. 3 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of managing computer resources in a dynamic computing environment, the method comprising:
   receiving an augmented model defining,
      resources to support application provisioning requirements,
      at least one tier, a relationship between the at least one tier and at least one deployment option associated with each tier, and
      installation programs, artifacts and configuration scripts that are used to configure application provisioning;
   identifying available resources from an available pool consistent with the augmented model, wherein the available pool comprises resources at least partially configured in accordance with the augmented model but not allocated;
   allocating the identified available resources from the available pool to an application in accordance with the augmented model;
   identifying reserve resources substantially similar to the identified and allocated resources in a reserve pool, wherein the reserve pool comprises resources not allocated to the application and not configured in accordance with the augmented model; and
   replenishing the available pool by allocating from the reserve pool to the available pool at least a portion of the identified reserve resources.

2. The method of claim 1 further comprising maintaining metrics for at least one of available resources, reserve resources, and allocated resources.

3. The method of claim 2 further comprising performing capacity planning utilizing the maintained metrics.

4. The method of claim 2 wherein replenishing only occurs when metrics regarding available resources indicate an amount of available resources are below a threshold level.

5. The method of claim 1 wherein determining comprises selecting resources from a group of resources to satisfy a requested application provisioning requirement.

6. The method of claim 5 wherein the group of resources comprises resources selected from the group consisting of compute resources, software application resources, network resources and storage resources.

7. The method of claim 1 wherein the desired application resources are used to add capacity to a web server farm.

8. The method of claim 1 wherein replenishing comprises configuring the identified reserve resources.

9. The method of claim 8 wherein configuring the identified reserve resources comprises configuring the identified reserve resources in accordance with a blueprint used to derive the augmented model.

10. The method of claim 8 wherein configuring the identified reserve resources comprises configuring the identified reserve resources in accordance with the augmented model.

11. A method of maintaining a pool of allocated computer resources to satisfy requests for application provisioning, the method comprising:
receiving an augmented model defining,
resources to support application provisioning requirements,
at least one tier, a relationship between the at least one tier and at least one deployment option associated with each tier, and
installation programs, artifacts and configuration scripts that are used to configure application provisioning;
maintaining an allocated resources pool identifying resources configured in accordance with the augmented model and allocated to support an application provisioning request;
maintaining an available resources pool identifying resources at least partially configured in accordance with the augmented model to support a future application provisioning request;
maintaining a reserve resources pool identifying resources unallocated by the application provisioning request and unconfigured in accordance with the augmented model;
receiving a request for a provisioned application based on the augmented model;
selecting resources from the available resources pool in accordance with the augmented model;
allocating the selected resources to the provisioned application; and
updating the available resources pool by allocating, from the reserve pool to the available pool, at least a portion of substantially matching resources from the reserve resources pool in order to replenish the available resources pool for utilization by the provisioned application.

12. The method of claim 11 wherein the available resources pool is further divided into a plurality of pools based on a degree of specificity to which each of the resources in the available pool have been pre-configured.

13. The method of claim 11 wherein updating comprises configuring the substantially matching resources from the reserve resources pool.

14. The method of claim 11 wherein the allocated resources pool, the available resources pool, and the reserve resources pool comprise resources selected from the group consisting of compute resources, software application resources, storage resources, and network resources.

15. The method of claim 11 wherein the selected resources comprise a virtual machine.

16. A non-transitory computer readable medium comprising computer readable instructions stored thereon to cause a processing device to perform the method of claim 1.

17. A non-transitory computer readable medium comprising computer readable instructions stored thereon to cause a processing device to perform the method of claim 11.

18. A computer network comprising:
a plurality of processing units communicatively coupled to a computer network;
a first processing unit configured to perform at least a portion of the method of claim 1 wherein the entire method of claim 1 is performed collectively by the plurality of processing units.

19. A computer network comprising:
a plurality of processing units communicatively coupled to a computer network;
a first processing unit configured to perform at least a portion of the method of claim 11 wherein the entire method of claim 11 is performed collectively by the plurality of processing units.

20. A computer system comprising one or more programmable control devices communicatively coupled to each other and to a computer network, wherein the one or more programmable control devices are programmed to perform the method of claim 1.

21. A computer system comprising one or more programmable control devices communicatively coupled to each other and to a computer network, wherein the one or more programmable control devices are programmed to perform the method of claim 11.

22. The method of claim 1 further comprising releasing the resources allocated to the application after replenishing the available pool.

23. The method of claim 11 further comprising releasing the resources allocated to the application after updating the available resources pool.

24. A method of managing computer resources in a dynamic computing environment, the method comprising:
receiving an augmented model defining,
resources to support application provisioning requirements,
at least one tier, a relationship between the at least one tier and at least one deployment option associated with each tier, and
installation programs, artifacts and configuration scripts that are used to configure application provisioning;
generating a first pool, the first pool including resources that are not allocated and not configured to support the application provisioning requirements based on the augmented model;
generating a second pool, the second pool including resources that are at least partially configured to support the application provisioning requirements based on the augmented model but are not allocated;
generating a third pool by allocating resources from the second pool to the third pool, the third pool including resources configured to support an application in accordance with the augmented model;
identifying resources in the first pool that are substantially similar to the resources in the third pool; and
allocating resources from the first pool to the second pool at least a portion of the identified resources.

25. The method of claim 24 further comprising releasing the resources allocated to the third pool after allocating resources from the first pool to the second pool.

26. The method of claim 24 wherein allocating resources from the first pool to the second pool only occurs when metrics regarding resources in the third pool indicate an amount of available resources are below a threshold level.

27. The method of claim 24, wherein
allocating resources from the first pool to the second pool comprises configuring the identified resources, and
configuring the identified resources comprises configuring the identified resources in accordance with a blueprint used to derive the augmented model.

* * * * *